(12) United States Patent
Siegel et al.

(10) Patent No.: US 9,398,131 B2
(45) Date of Patent: Jul. 19, 2016

(54) MOBILE DEVICE DATA TRANSFER

(75) Inventors: Jeffrey Siegel, Los Gatos, CA (US); William J. Loewenthal, Jr., San Mateo, CA (US)

(73) Assignee: Plantronics, Inc., Santa Cruz, CA (US)

( * ) Notice: Subject to any disclaimer, the term of this patent is extended or adjusted under 35 U.S.C. 154(b) by 73 days.

(21) Appl. No.: 13/474,651

(22) Filed: May 17, 2012

(65) Prior Publication Data

US 2013/0309996 A1 Nov. 21, 2013

(51) Int. Cl.
*H04M 1/60* (2006.01)
*H04M 1/725* (2006.01)

(52) U.S. Cl.
CPC .......... *H04M 1/6058* (2013.01); *H04M 1/6066* (2013.01); *H04M 1/7253* (2013.01)

(58) Field of Classification Search
CPC ............ H04M 1/7253; H04M 1/6066; H04M 1/6075; H04M 2250/02; H04M 1/04; H04M 1/6058; H04M 1/72505; H04M 2250/64; H04M 1/2535; H04M 1/6041; H04W 88/02; H04W 4/008
USPC ......... 455/41.2, 405, 414.1, 417, 569.1, 41.3, 455/550.1, 41.1, 556.1, 517
See application file for complete search history.

(56) References Cited

U.S. PATENT DOCUMENTS

| | | | |
|---|---|---|---|
| 6,546,096 B1 | 4/2003 | Meiden et al. | |
| 8,600,030 B2 | 12/2013 | Kannappan et al. | |
| 2004/0203351 A1* | 10/2004 | Shearer et al. | 455/41.1 |
| 2005/0129205 A1* | 6/2005 | Klein | 379/201.04 |
| 2006/0142665 A1* | 6/2006 | Garay et al. | 600/508 |
| 2007/0288227 A1* | 12/2007 | Kim et al. | 703/24 |
| 2008/0259829 A1 | 10/2008 | Rosenblatt | |
| 2009/0305632 A1 | 12/2009 | Sarkissian et al. | |
| 2009/0327888 A1* | 12/2009 | Woolf et al. | 715/704 |
| 2010/0066677 A1 | 3/2010 | Garrett et al. | |
| 2010/0151845 A1* | 6/2010 | Rountree | 455/417 |
| 2011/0207447 A1* | 8/2011 | Bhow | H04M 1/2535 455/417 |
| 2011/0258319 A1 | 10/2011 | Efthymiou et al. | |
| 2012/0005281 A1 | 1/2012 | Winter et al. | |
| 2012/0094644 A1* | 4/2012 | Hayashi et al. | 455/418 |
| 2012/0327812 A1 | 12/2012 | Xiao et al. | |

FOREIGN PATENT DOCUMENTS

| | | |
|---|---|---|
| EP | 1672940 A1 | 6/2006 |
| WO | WO-2006/020168 A2 | 2/2006 |

OTHER PUBLICATIONS

Mobile and Landline Call Switching. U.S. Appl. No. 13/474,615, filed May 17, 2012. Inventor: Jeffrey Siegel.
User Application Initiated Telephony. U.S. Appl. No. 13/044,802, filed Mar. 10, 2011. Inventors: Frederick Sakissian, Jeffrey Siegel.
International Search Report and Written Opinion mailed Oct. 9, 2013, for international application No. PCT/US2013/041013.
International Search Report and Written Opinion for international application No. PCT/US2013/040991, filed May 14, 2013.
International Preliminary Report on Patentability mailed Jul. 24, 2014, for international application No. PCT/US2013/041013.

* cited by examiner

*Primary Examiner* — Dinh P Nguyen (74) *Attorney, Agent, or Firm* — Chuang Intellectual Property Law (57) ABSTRACT

Methods and apparatuses for mobile device data transfer are disclosed. In one example, data is received associated with mobile device usage. An action is performed at a computing device responsive to the data.

22 Claims, 5 Drawing Sheets

MOBILE DEVICE DATA TRANSFER

BACKGROUND OF THE INVENTION

Most individuals have several telephony devices (also referred to herein as "telephones" or "telecommunications devices") available to them to make and receive calls. Mobile telephones, such as cellular telephones, have become ubiquitous as users enjoy the convenience and portability they provide. Current mobile phones, and "smartphones" in particular, offer a variety of computing functionality. For example, in addition to telephony application functions such as making calls, receiving calls, receiving caller identification data, and logging call activity, mobile phones can execute a variety of software applications.

A variety of data associated with usage of the mobile phone is or is potentially available. In the prior art, access to and use of this data has been limited. Thus, improved methods and apparatuses for mobile device data transfer and usage are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for mobile device data transfer and usage are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, a computer readable storage memory stores instructions that when executed by a computer cause the computer to perform a method including receiving a data associated with a mobile device usage, and performing an action at a computing device responsive to the data.

In one example, a computing device includes a wireless transceiver configured for wireless communications with a mobile device, a processor, a display, and a user interface. The computing device further includes a memory storing an application configured to receive a data over the wireless transceiver associated with a usage of the mobile device, where the application is further configured to perform an action responsive to the data.

In one example, a method for utilizing mobile phone data includes receiving at a computing device from a mobile phone over a local wireless communications link a data associated with a mobile phone usage, and processing the data to responsively perform an action at the computing device.

In one example, a system for utilizing a headset includes a computing device, a mobile phone configured for wireless communications with the computing device and a remote telephone device, and a headset coupled to the computing device. The computing device is configured to facilitate voice communications between the headset and the remote telephone device through the mobile phone.

In one example, a method for utilizing a headset includes receiving audio communications from a mobile phone over a local wireless link. For example, the audio communications are received at a computing device. The method further includes transferring the audio communications to an audio device at or coupled to the computing device. For example, the audio device is a wireless or wired headset coupled to the computing device or a computing device speakerphone. Audio communications are received from the audio device and transferred to the mobile phone from the computing device.

In many cases, individuals receive calls on their mobile phone while in the office. The inventors have recognized that in these situations, because the call recipient is in close proximity to their personal computer, the personal computer can be used in conjunction with the mobile phone to perform actions to assist the call recipient responsive to or associated with activity of the mobile phone. In one example, contextual data is captured via a Bluetooth link connecting a computing device (e.g., the PC or tablet type device) to a mobile phone. In one example, the contextual data (also referred to herein as "contextual information") is transferred automatically to the computing device from the mobile phone based on proximity and automatically acted upon. The user may be prompted with one or more options to take further action. This enables a computer application to leverage the contextual information about the user and the caller (or callee) to determine when to take appropriate actions on behalf of the user. In one example, a new audio channel is established between a PC connected audio device (headset or speakerphone) and the mobile phone through this same wireless PC to mobile phone connection.

In one example, contextual information about the users proximity (to their PC or tablet), identity of both the caller and the called party, and activity in a specific mobile application or on a mobile call is passed to the PC directly from the mobile phone over a wireless connection (e.g., Bluetooth) to the PC. This enables a PC native or browser based application to determine when to take an action on behalf of the user. These actions could include a wide range of possibilities such as logging the user out of an application or lock the PC, displaying information relevant to what the user might need in the moment, or initiating an application or application feature (e.g., presenting the user with an option to terminate a mobile call while re-initiating that call from the PC). In addition, capturing this rich set of contextual information about the user together with the user's actions may be used to create a data log that is be mined by analytics engines. Finally, it would allow a corded audio device like a headset or speakerphone or a wireless headset connected indirectly to the mobile phone through a direct connection to the PC to be used as the audio device for a call on the mobile phone, thereby eliminating the need for multiple audio devices when using both the PC/tablet and a mobile phone for communications with others.

In one example, contextual states about the user (physical, communications, and application usage data) are captured over a wireless connection to enable PC, tablet, or Browser-based applications to take actions that benefit the user and/or the organization, as well as allow for the analysis of this data by analytics engines. The contextual states can include (1) mobile phone proximity to the PC/tablet, (2) mobile telephony presence to detect an inbound (or outbound) call, (3) mobile callerID to identify the calling or called party, (4) what devices/applications (e.g., a PC/tablet, mobile phone, or deskphone) were used to make that call, (5) what applications were being used on the mobile phone, and (6) how those mobile applications were being used.

In one example, a rich set of contextual data about the user and their environment is captured from a mobile phone over a wireless point to point connection to the PC/tablet/browser application and a determination is made of what actions to take on behalf of the user. Audio may be routed over a Bluetooth (or other wireless link) between the mobile phone and the PC/tablet such that a USB connected audio device (speakerphone or headset) can be used for the audio channel through the PC/tablet to the mobile phone. In one example, a software application residing on the PC/tablet is utilized, a dongle inserted into the USB port of that PC/tablet to enable both Bluetooth connectivity of voice and data is utilized, and/or a software application residing on the mobile phone itself is utilized to perform functions described herein.

In one example, the computing device is a speakerphone device. The speakerphone device is coupled to the PSTN and a personal computer. The speakerphone device is capable of wireless communications with a mobile phone device using, for example, Bluetooth. In operation, when the mobile phone comes in range of the speakerphone device, it is capable of transferring the call to the speakerphone device so that the user can utilize the speakerphone device instead of the mobile phone. The mobile phone also transfers the contextual data to the speakerphone device. The speakerphone device then transfers this data to the PC, and the PC responsively acts upon or utilizes the contextual data.

These methods and systems reduce or eliminate the time-intensive actions that the user would have to manually perform in order to have the application feature or contextual information available to them when they needed it. By eliminating the time and effort required to access the application feature or the information at the 'moment of need' the user is now more productive and effective in collaborating, communicating, or simply better off due to actions taken on their behalf which they may not have not themselves due to the obstacles noted above. Advantageously, contextual data is shared across applications and devices in such a way that applications can better serve the user, including in real-time where the need is the greatest.

In addition to benefiting the user, the described methods and systems benefit the entire organization by improving security or reducing costs. For example, mobile phones are often used in place of landline phones such as office phones. As a result, systems designed to track usage of a user's landline phone are unable to track much of the call activity of a given individual because the individual is using his mobile phone in many instances. The methods and systems described herein provide for the transfer of mobile phone usage data to systems designed to track call activity across all employees and devices.

Other advantages include reducing the manual effort involved in capturing some of this contextual data in transaction systems (i.e., systems of record) such as customer relations management (CRM), service desk, or other similar systems. Once this contextual data is captured, it can be used to auto-populate transaction systems with reduced error and improved worker productivity. The methods and systems may be used to supply analytics engines which can incorporate this data to create a more holistic view of the user's environment and actions, hence eliminating the mobile blind side that exists today.

In one example, the described methods and systems allow a corded audio device like a headset or speakerphone or a wireless headset connected indirectly to the mobile phone through a direct connection to the PC/tablet, to be used as the audio device for a call on the mobile phone. This provides a solution to the problem of needing multiple audio devices when using both the PC/tablet and a mobile phone for communications with others.

The described systems and methods advantageously enable applications to be of greater value to users, particularly when triggered by changes in physical or communication states on the mobile phone. Overcoming the hurdles of high user manual effort and mindfulness to get at the needed data across multiple applications together with low latency required by the user to be responsive to incoming mobile phone calls allows the user to be better prepared and more effective when answering a mobile phone call. Other advantages include improving security of data and application access, and improvement of analytics engines to better report on actual application usage. The net result is a more secure environment, greater user productivity, more effective communications and collaboration, and the ability to use one audio device across both PC/tablet and mobile phone communications.

Figure 1:
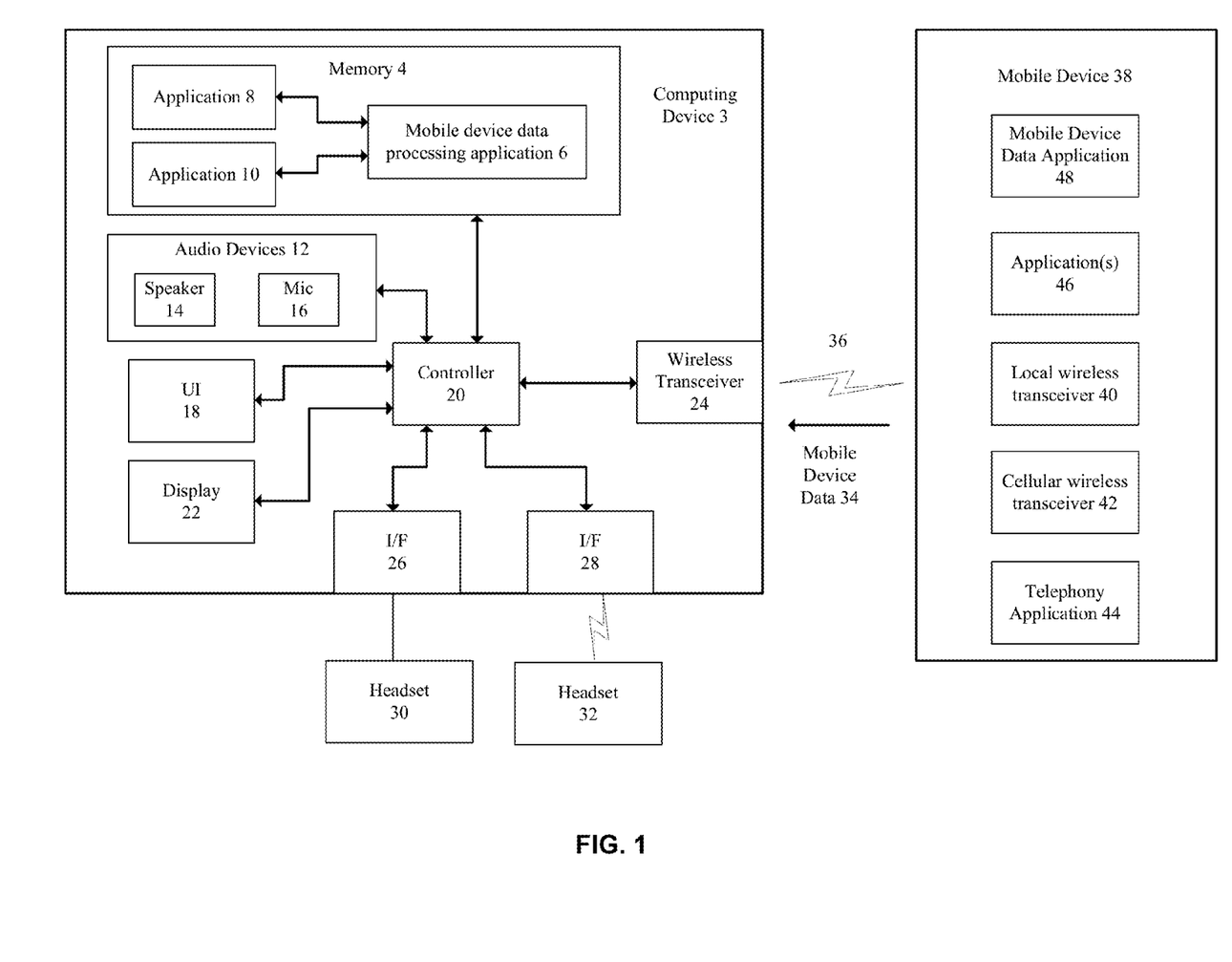
FIG. 1 illustrates a system for mobile device data transfer in one example.

FIG. 1 illustrates a simplified system for mobile device data transfer in one example. System 100 includes a computing device 3 and a mobile device 38. Computing device 3 may be, for example, desktop personal computer, tablet type computer device, or a notebook computer. Computing device 3 includes a memory 4, audio devices 12, user interface 18, controller 20 having one or more processors, display device 22, wireless transceiver 24, data I/O interface 26, and data I/O interface 28. Audio devices 12 include a speaker 14 and microphone 16 operable as a speakerphone. Data I/O interface 26 may, for example, be a wired interface such as a USB interface. In one example, a wired headset 30 is coupled to interface 26. Data I/O interface 28 may, for example, be a wireless interface. In one example, a wireless headset 32 is coupled to interface 28. In one example, wireless transceiver 24 is a Bluetooth communications transceiver. In one example, wireless transceiver 24 is in the form of a USB Bluetooth "dongle" which may be coupled to computing device 3 via a USB interface that allows software applications to be used. In this example, the USB BT module runs a Bluetooth stack optimized for audio performance. The USB BT module is any base unit, including dongles, operating vendor specific firmware connected to computing device 3.

Memory 4 includes a mobile device data processing application 6 which is configured to receive and process mobile device data 34 from mobile device 38 and perform actions at computing device 3 in response. For example, mobile device data processing application 6 may perform actions with respect to an application 8 or application 10. In one example, the action is to retrieve and display an information at the display device 22 associated with the data 34. For example, the information displayed may be calling party information associated with a calling party to the mobile device.

In one example, the action is to log a user out of an application 8 or application 10 at the computing device. In one example, the action is to launch an application 8 or application 10 or cause an application action by application 8 or application 10. In one example, the application 6 is further configured to detect the proximity of mobile device 38, which may include detecting a transition from an out of range status to an in range status or a transition from a far status to a near status.

In a further example, the action is to transfer to a computing device 3 audio device a mobile device audio comprising voice communications associated with an active call between a mobile device user and a far end call participant. For example, the audio device may be audio device 12 operating as a speakerphone, a wired headset 30 coupled to wired interface 26, or a wireless headset 32 coupled to wireless interface 28.

Mobile device data 34 may take a variety of forms. For example, data 34 may include user proximity data, mobile device applications usage, or a mobile device call data. The mobile device call data may include data associated with an incoming call being received, an outbound call being initiated, call participant identity data, a current active call or a previous call history. In a further example, the data 34 may indicate a change in a mobile device physical state or communication state.

In one example, all call activity on a mobile phone is logged by an application on the mobile phone and subsequently transferred and synchronized with the corporate IT infrastructure on return to the office. The transfer may be automatic based on headset proximity or mobile phone proximity to computing device 3. Advantageously, this allows a company to have data for all calls (e.g., caller identification information, call duration, etc.) made by employees, including all calls made or received on employee mobile phones.

In one example, mobile device 38 is a mobile phone such as a smartphone. Mobile device 38 includes a mobile device data application 48, one or more applications 46, a telephony application 44, a cellular transceiver 42, and a local transceiver 40. For example, local transceiver 40 is a Bluetooth communications transceiver capable of forming a wireless link 36 with transceiver 24 at computing device 3 to transmit mobile device data 34.

In one example operation, computing device 3 receives from mobile device 38 over a local wireless communications link 36 mobile device data 34 associated with usage and operation of mobile device 38, both current and prior. Computing device 3 processes the mobile device data 34 and responsively performs an action at the computing device 3.

Figure 2:
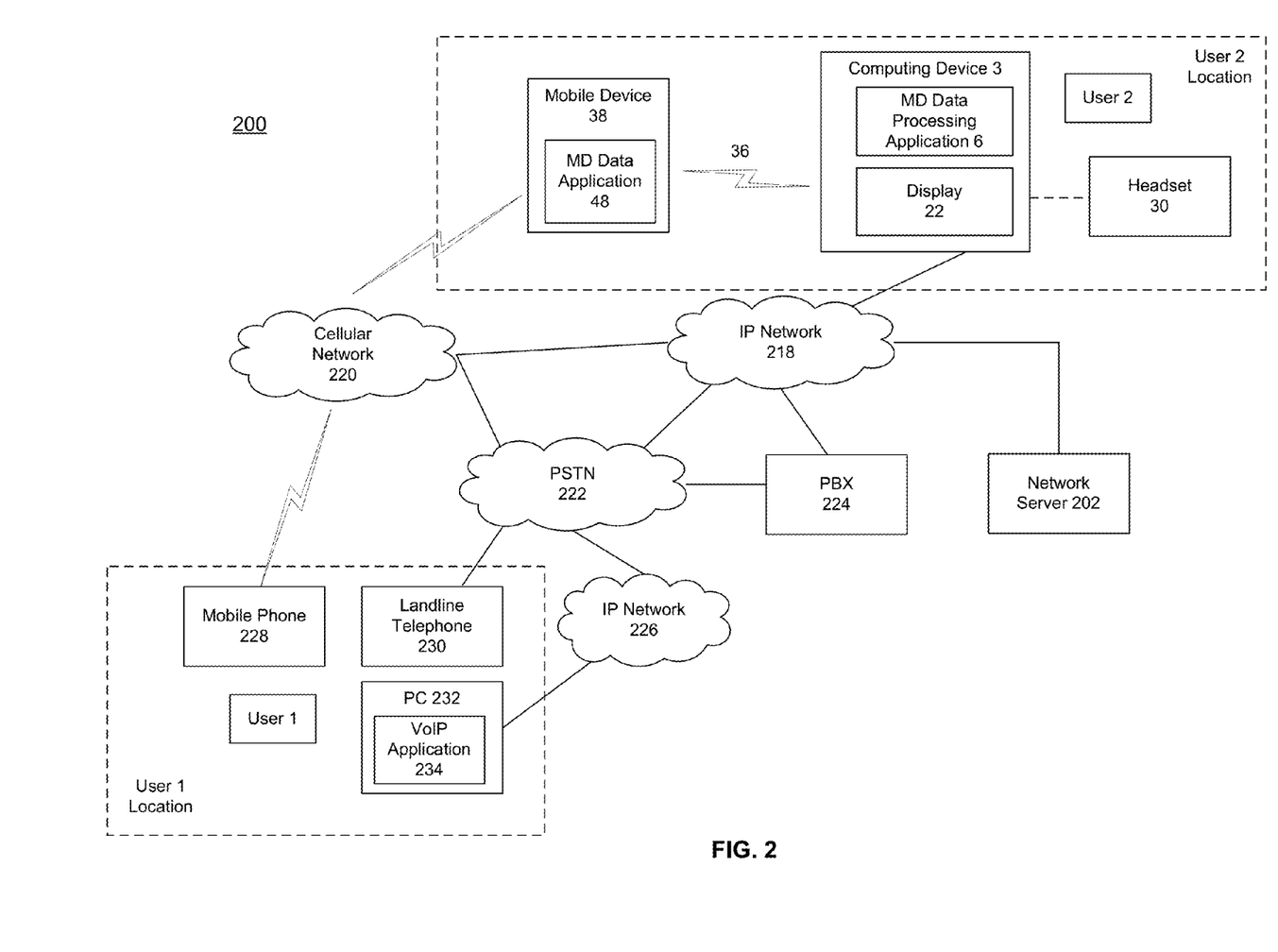
FIG. 2 illustrates a system for mobile device data transfer in one example.

FIG. 2 illustrates a system 200 for mobile device data transfer in one usage example. Illustrated in FIG. 2 is a user 1 at a user 1 location and a user 2 at a user 2 location. At the user 2 location, the system includes a mobile device 38 executing a mobile device data application 48 in communication with a computing device 3 executing a mobile device data processing application 6. Computing device 3 may, for example, be a notebook computer, a desktop computer, or a tablet computer. In operation, mobile device 38 may be in communication range or out of communication range with computing device 3 depending upon movement of user 2. A headset 32 is connected to computing device 3. A network server 202 is connected to IP Network 218 and accessible by computing device 3.

At the user 1 location, the system includes a mobile phone 28 in wireless communication with cellular network 210, a landline telephone 230 coupled to PSTN 222, and a PC 232 coupled to IP network 226. PC 232 executes a VoIP application 234. Mobile device 38 at user 2 location is in wireless communication with cellular network 220, and can receive incoming calls via the cellular network 220 from a user 1 utilizing mobile phone 228, landline telephone 230, or VoIP application 234.

Application 6 is configured to receive data associated with an active wireless mobile phone call, the data including caller identification data corresponding to a calling party. In one example, mobile device data processing application 6 receives the caller identification data corresponding to a calling party prior to the call being answered by the called party. For illustrative purposes, in this usage scenario example, user 1 is the calling party and user 2 is the called party for the active wireless mobile phone call. In one example, the active wireless mobile phone call is between user 1 and user 2 over cellular communications network 220. In one usage scenario, mobile device data processing application 6 retrieves information about user 1 and displays it on display 22 at computing device 3. The information may be displayed prior to user 2 answering the call, or while the call is in progress.

In one example, the displayed information may be customer relations management data about user 1 retrieved from a customer relations management application. In one usage scenario, a call is received by user 2 at mobile device 38 when the mobile device 38 is within range or a close proximity to computing device 3. Caller identification information received with the call is sent to mobile device data application 48 at computing device 3 over wireless link 36. Application 48 may automatically launch a customer relations management application or access such an application over the Internet (e.g., from Salesforce.com or similar) and locate a customer record corresponding to the caller identification information.

For example, if the caller identification indicates the caller name of user 1 is "John Smith", an "Account Detail" page for "John Smith" is accessed and displayed on the computing device 3. For example, the "Account Detail" page may include information fields associated with the "Account Owner" (e.g., John Smith), "Account Name", "Account Number", "Annual Revenue", "Industry", "Phone Number", "Website", "Ticker Symbol", "Billing Address", and "Shipping Address". Other customer data displayed for this account may include "Last Invoice Date", "Last Invoice Paid Date", "Last Amount Due", "Last Amount Paid", "Credit Class", and "Billing Type". The customer data may also include a list of tasks or events associated with the customer, including a list of "Open Activities". In this manner, the user 2 can view available information about user 1 (e.g., John Smith) to assist with conducting the call.

In a further example scenario, mobile device data processing application 6 is configured to receive data associated with prior call data or any application operating on mobile device 38. Application 6 may transmit the received data to a cloud based network server 202. Network server 202 may, for example, be a presence server, application server, database server, security system, analytics engine, PBX, or performance/monitoring system.

In one example, mobile device data processing application 6 is further configured to detect mobile device 38 in communication range of computing device 3, the mobile device in use with the active wireless mobile phone call. In one example, detecting the mobile device 38 in communication range includes detecting a transition from an out-of-range status to an in-range status as described in reference to FIG. 4 below.

Figure 3:
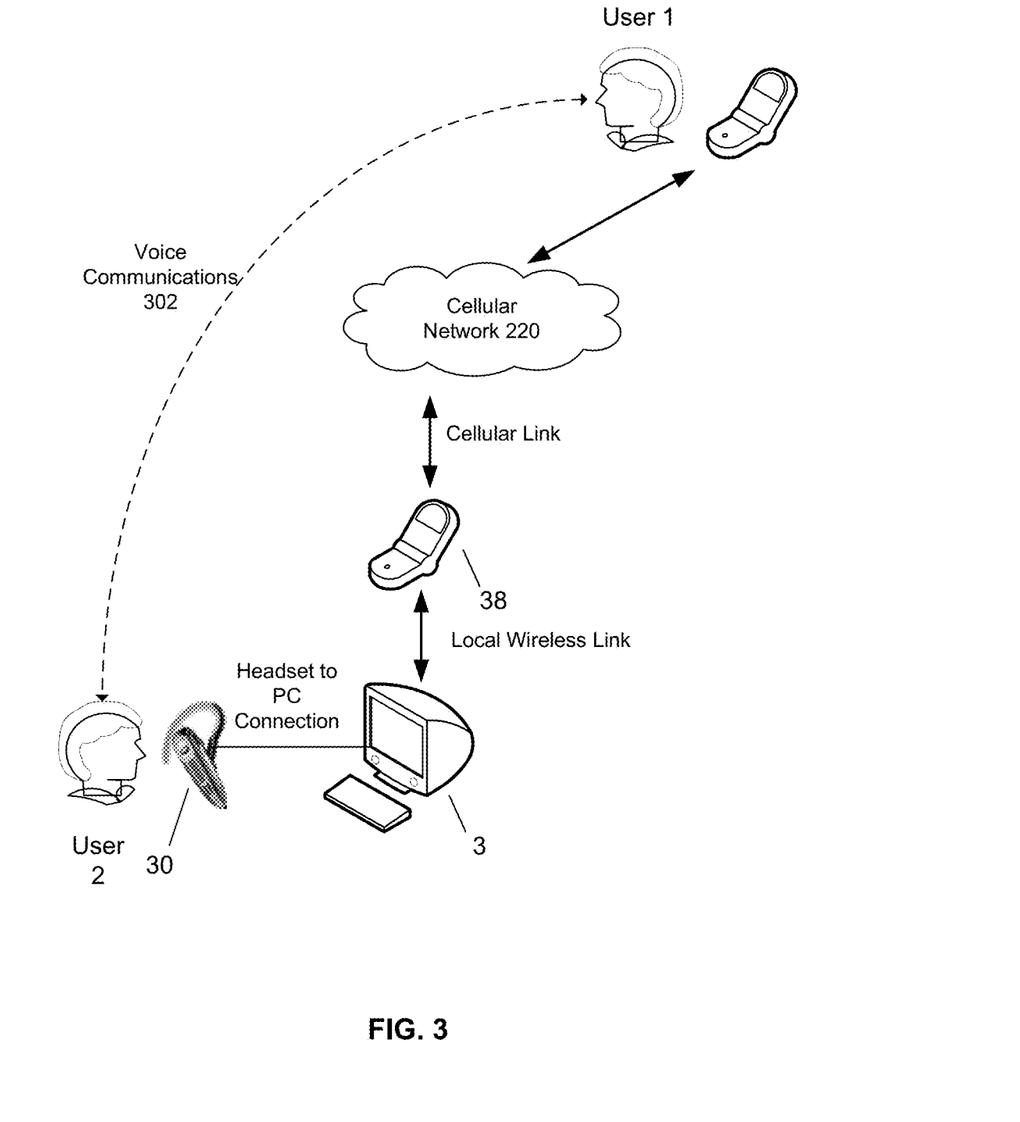
FIG. 3 illustrates the system shown in FIG. 2 in one example usage scenario.

FIG. 3 illustrates the system shown in FIG. 2 in one example usage scenario. Referring to FIG. 3 in conjunction with FIG. 2, in one usage scenario a system includes a mobile device 38, computing device 3, and a headset 30. Headset 30 is coupled to computing device 3. Computing device 3 and mobile device 38 are configured for wireless communications there between.

In one example, voice communications are routed to USB headset 30 having a USB port coupled to a USB port (e.g., interface 28) of computing device 3. When the USB ports of UBS headset 30 and the computing device 3 USB port are mated, enumeration of USB headset 30 occurs. The host device, computing device 3, detects the attachment of USB headset 30. During enumeration, computing device 3 sends control transfers containing standard USB requests to the USB headset 30. The USB headset 30 must respond to each request by returning requested information and taking any requested actions. The firmware of USB headset 30 may contain the information computing device 3 requests, and a combination of hardware and firmware may respond to request for the information. During enumeration, the USB headset 30 moves through four states: Powered, Default, Address, and Configured.

During the enumeration process, the USB headset 30 defines a series of its capabilities, including its number of USB audio endpoints. A USB audio endpoint is declared for each audio transducer or transducer set at the USB headset 30. For example, a USB headset 30 having an audio transducer consisting of a microphone and an audio transducer set consisting of a speaker pair will declare two USB audio endpoints during enumeration. One USB audio endpoint is declared for the microphone (i.e., an "audio input endpoint" or "input audio endpoint") and one USB audio endpoint is declared for the speaker pair (i.e., an "audio output endpoint" or "output audio endpoint").

Referring again to FIG. 3 in conjunction with FIG. 2, in one example, computing device 3 receives and transmits audio (e.g., voice communications) between computing device 3 and mobile device 38 utilizing transceiver 24. For example, transceiver 24 is a Bluetooth module utilizing the Bluetooth Headset Profile to transmit voice communications to and from mobile device 38. In this example, computing device 3 is wirelessly connected to a mobile device 38 via a Bluetooth link. When paired and in range, computing device 3 maintains an ACL link with mobile device 38. Mobile device 38 includes a BT audio gateway. The Bluetooth audio gateway is the gateway for both input audio and output audio. The computing device 3 acts as remote audio input and output mechanism for the Bluetooth audio gateway. The profile stack for the Headset Profile illustrating the protocols and entities regarding how a device and audio gateway interact to effect a wireless connection between the devices is known in the art.

Mobile device data processing application 6 (or a separate audio management application) executing on computing device 3 is configured to receive and transmit this audio data to and from USB headset 30 so that a user 2 may utilize USB headset 30 for the call between mobile device 38 and a far end call participant (e.g., user 1) using mobile phone 228, landline telephone 230, or PC 232. In a further example, the user 2 may utilize a wired headset 30 coupled to wired interface 26, or an audio device 12 for the call between mobile device 38 and a far end call participant (e.g., user 1) using mobile phone 228, landline telephone 230, or PC 232.

Figure 4:
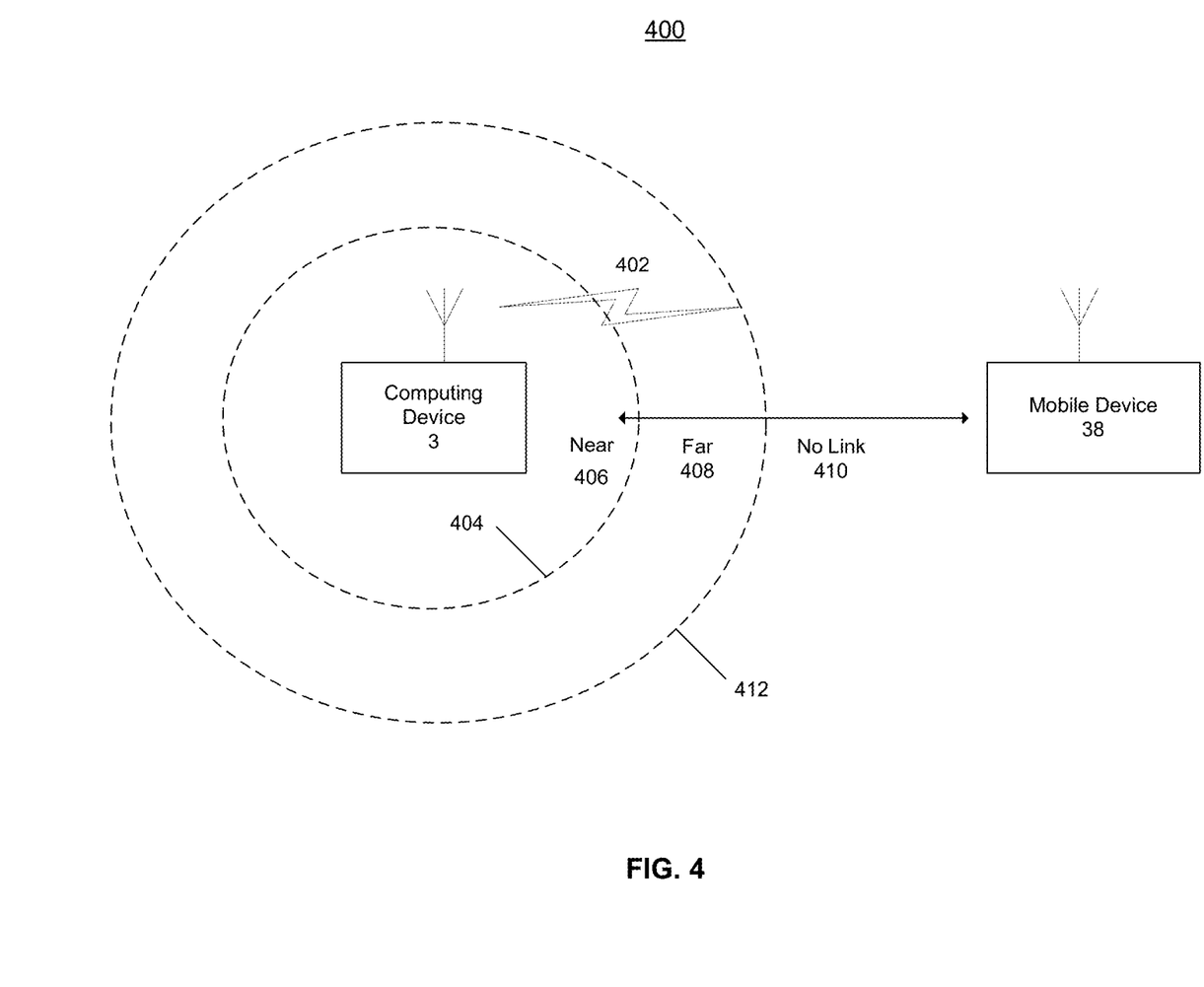
FIG. 4 illustrates an example usage scenario where a mobile device transitions between a near state, far state, or no-link state with respect to a base computing device.

FIG. 4 illustrates an example usage scenario for a call transitioning system where a wireless communication device (e.g., a mobile device 38) transitions between a near state, far state, or no-link state with respect to a base computing device (e.g., computing device 3). In one example, the wireless communications device is a mobile phone. A system 400 includes a computing device 3 and mobile device 38 capable of wireless communication there between as previously described. The received signal strength indicator (RSSI) of the wireless link 402 is measured and monitored to determine the proximity of the mobile device 38 from the computing device 3.

In system 400, a proximity boundary 404 establishes a range from computing device 3 below which mobile device 38 is considered to be in a NEAR state 406 and beyond which mobile device 38 is considered to be in a FAR state 408.

A link availability boundary 412 establishes a range from computing device 3 beyond which mobile device 38 can no longer maintain wireless link 402. In one example, mobile device 38 is a Bluetooth headset operating in class 2 mode. In class 2 mode, mobile device 38 has a +4 dBm transmit power and −82 dBm receive sensitivity, resulting in a range of about 10 meters. Thus, in this example, link availability boundary 908 is approximately 10 meters, beyond which the mobile device 38 is unable to form a wireless link 402 with computing device 3 and is therefore in a no-link state 410.

System 400 utilizes RSSI values and the link status of link 402 to determine whether mobile device 38 is in a NEAR state, FAR state, or no-link state using methods described herein. In one example, responsive to this NEAR/FAR/No-Link determination, computing device 3 is configured to receive data from mobile device 38. The data transfer system may be automatically configured or the user may select that the data transfer operate based on NEAR/FAR status, link status, or both NEAR/FAR and link status. In further examples, other methods and apparatuses for determining proximity between devices may be utilized. For example, radio frequency identification (RFID), infrared (IR), or GPS units may be used.

Figure 5:
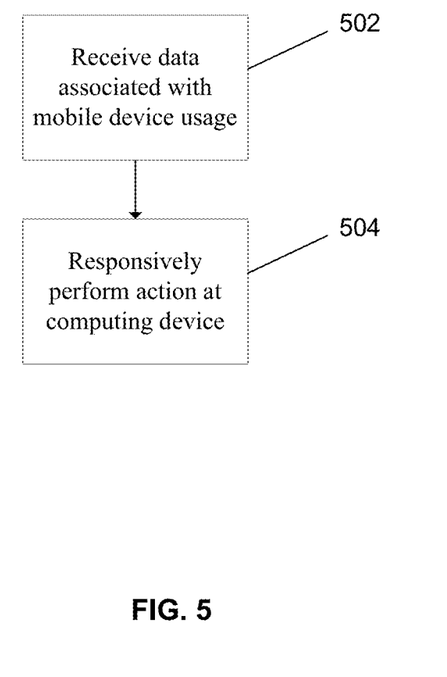
FIG. 5 is a flow diagram illustrating a method for mobile device data transfer and usage in one example.

FIG. 5 is a flow diagram illustrating a method for call initiation in one example. At block 502, data is received associated with a mobile device usage. In one example, the data is a user proximity data, mobile device application usage, or a mobile device call data. Mobile device call data is, for example, data associated with an incoming call being received, an outbound call being initiated, call participant identity data, a current active call or a previous call history. In one example, the data is received over a Bluetooth communications link. In one example, the data indicates a change in a mobile device physical state or communication state.

In a further example, the data is voice communications associated with a telephone call, and the action is to transfer voice communications between a headset coupled to the computing device and a remote telephone in communication with the mobile phone.

At block 504, an action at a computing device is performed responsive to the data. In one example, the action is to log a user out of an application at the computing device. In one example, the action is to launch an application at the computing device or cause an application action at the computing device.

In one example, the action is to display an information at the computing device associated with the data. The information displayed may be a calling party information associated with a calling party to the mobile device.

In one example, the action is to transfer a mobile device audio to an audio device coupled to the computing device. The audio device may be a headset coupled to the computing device via a USB port, a wireless headset in wireless communication with the computing device, or a computing device speakerphone. For example, the mobile device audio is voice communications associated with an active call between a mobile device user and a far end caller.

In one example, the method further includes detecting a proximity of a mobile device. Detecting a proximity of the mobile device may include detecting a transition from an out of range status to an in range status. The mobile device may be a wireless headset or mobile phone.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
  receiving at a computing device from a mobile phone a contextual data associated with a mobile phone usage, wherein the computing device is operable to transfer a mobile phone audio between the mobile phone and an audio device coupled to the computing device;
  performing a first action responsive to the contextual data, the first action comprising retrieving customer relations management data corresponding to the contextual data, the customer relations management data previously stored at the computing device prior to receiving the contextual data associated with the mobile phone usage; and
  performing a second action at the computing device responsive to the contextual data, the second action comprising presenting the user with an option to transmit current voice communications for an active call on the mobile phone to the audio device coupled to the computing device, the current voice communications transmitted over a communications link between the audio device and the computing device and the current voice communications transmitted over a local wireless communications link between the mobile phone and the computing device during the active call on the mobile phone, wherein the contextual data is captured in a transaction system via a Bluetooth link connecting the computing device to the mobile phone to auto-populate the transaction system.

2. The one or more non-transitory computer-readable storage media of claim 1, the operations further comprising detecting a proximity of the mobile phone.

3. The one or more non-transitory computer-readable storage media of claim 2, wherein detecting a proximity of the mobile phone comprises detecting a transition from an out of range status to an in range status.

4. The one or more non-transitory computer-readable storage media of claim 1, wherein the action further comprises logging a user out of an application at the computing device.

5. The one or more non-transitory computer-readable storage media of claim 1, wherein the action further comprises launching an application at the computing device or causing an application action at the computing device.

6. The one or more non-transitory computer-readable storage media of claim 1, wherein the information displayed is a calling party information associated with a calling party to the mobile phone.

7. The one or more non-transitory computer-readable storage media of claim 1, wherein the audio device is a headset coupled to the computing device via a USB port, a wireless headset in wireless communication with the computing device, or a computing device speakerphone.

8. The one or more non-transitory computer-readable storage media of claim 1, wherein the data comprises a user proximity data, mobile phone application usage, or a mobile phone call data.

9. The one or more non-transitory computer-readable storage media of claim 8, wherein the mobile phone call data comprises data associated with an incoming call being received, an outbound call being initiated, call participant identity data, a current active call or a previous call history.

10. The one or more non-transitory computer-readable storage media of claim 1, wherein the data is received over a Bluetooth communications link.

11. The one or more non-transitory computer-readable storage media of claim 1, wherein the data indicates a change in a mobile phone physical state or communication state.

12. A computing device comprising:
  a wireless transceiver configured for wireless communications with a mobile phone;
  a processor;
  a display;
  a user interface; and
  a memory storing an application configured to detect a transition of the mobile phone from an out of range proximity status to an in range proximity status, and subsequent to detecting the transition receive a contextual data associated with an active call on the mobile phone over the wireless transceiver from the mobile phone, the application further configured to perform actions responsive to the contextual data, the actions comprising retrieving customer relations management data corresponding to the contextual data, the customer relations management data previously stored at the computing device prior to receiving the contextual data associated with the active call, and the actions further comprising presenting the user with an option to transmit current voice communications for the active call to an audio device coupled to the computing device, the current voice communications transmitted over a communications link between the audio device and the computing device and the current voice communications transmitted over a local wireless communications link between the mobile phone and the computing device using the wireless transceiver during the active call on the mobile phone, wherein the contextual data is captured in a transaction system via a Bluetooth link connecting the computing device to the mobile phone to auto-populate the transaction system.

13. The computing device of claim 12, wherein the wireless transceiver is a Bluetooth communications transceiver.

14. The computing device of claim 12, wherein the audio device is a speaker phone, a wired headset coupled to a computing device wired interface, or a wireless headset coupled to a computing device wireless interface.

15. The computing device of claim 12, wherein the application is further configured to detect a proximity of the mobile phone.

16. The computing device of claim 12, wherein the contextual data comprises a user proximity data, a mobile phone application usage, or a mobile phone call data.

17. The computing device of claim 16, wherein the mobile phone call data comprises data associated with an incoming call being received, an outbound call being initiated, call participant identity data, a current active call or a previous call history.

18. The computing device of claim 12, wherein the contextual data indicates a change in a mobile phone physical state or communication state.

19. A method for utilizing mobile phone data comprising:
receiving at a computing device from a mobile phone over a local wireless communications link between the mobile phone and the computing device a contextual data associated with a mobile phone usage, the contextual data comprising a caller identification data and voice communications associated with a telephone call;
processing the contextual data to responsively perform actions at the computing device, the actions comprising retrieving customer relations management data corresponding to the caller identification data, the customer relations management data previously stored at the computing device prior to receiving the contextual data associated with the mobile phone usage, the actions further comprising transmitting a current voice communications for an ongoing call between a headset coupled to the computing device and a remote telephone in communication with the mobile phone during an ongoing call on the mobile phone, the current voice communications transmitted over a communications link between the headset and the computing device and the current voice communications transmitted over the local wireless communications link between the mobile phone and the computing device during the ongoing call on the mobile phone, wherein the contextual data is captured in a transaction system via a Bluetooth link connecting the computing device to the mobile phone to auto-populate the transaction system; and
displaying the customer relations management data.

20. The method of claim 19, wherein the contextual data comprises a user proximity data, a mobile phone application usage, or a mobile phone call data.

21. The method of claim 19, wherein the actions comprise launching a customer relations management application.

22. The method of claim 19, wherein the customer relations management data comprises an account data or a customer data.

* * * * *